(12) United States Patent
Blanco Varela et al.

(10) Patent No.: US 10,773,824 B2
(45) Date of Patent: Sep. 15, 2020

(54) STRUCTURAL COMPOSITE COMPONENT AND METHOD FOR CONFIGURING A STRUCTURAL COMPOSITE COMPONENT

(71) Applicant: Airbus Operations, S.L., Getafe (Madrid) (ES)

(72) Inventors: Tamara Blanco Varela, Madrid (ES); José Sanchez Gomez, Madrid (ES); Leire Segura Martinez De Ilarduya, Madrid (ES); Mariano Morales Monge, Madrid (ES)

(73) Assignee: Airbus Operations, S.L. (ES)

( * ) Notice: Subject to any disclaimer, the term of this patent is extended or adjusted under 35 U.S.C. 154(b) by 324 days.

(21) Appl. No.: 15/817,826

(22) Filed: Nov. 20, 2017

(65) Prior Publication Data

US 2018/0155055 A1 Jun. 7, 2018

(30) Foreign Application Priority Data

Nov. 23, 2016 (EP) .................................... 16382550

(51) Int. Cl.
*B64D 45/02* (2006.01)
*B29C 70/88* (2006.01)
(Continued)

(52) U.S. Cl.
CPC ............ *B64D 45/02* (2013.01); *B29C 70/885* (2013.01); *B32B 3/26* (2013.01); *B32B 5/00* (2013.01); *B32B 5/02* (2013.01); *B32B 7/00* (2013.01); *B32B 7/02* (2013.01); *B32B 7/04* (2013.01); *B32B 7/06* (2013.01); *B32B 7/10* (2013.01); *B32B 9/00* (2013.01); *B32B 9/04* (2013.01); *B32B 15/00* (2013.01); *B32B 15/02* (2013.01); *B32B 15/04* (2013.01); *B32B 15/08* (2013.01);
(Continued)

(58) Field of Classification Search
USPC .......................................... 361/212, 218, 220
See application file for complete search history.

(56) References Cited

U.S. PATENT DOCUMENTS

2013/0059173 A1* 3/2013 Hucker ................... H01M 2/08
429/9
2016/0368613 A1 12/2016 Rives et al.
2017/0217604 A1* 8/2017 Birchak ................. B64D 13/04

FOREIGN PATENT DOCUMENTS

CN 204 155 945 U 2/2015
CN 204 879 912 U 12/2015
(Continued)

OTHER PUBLICATIONS

Search Report EP 16382550.8 dated Feb. 23, 2017.

*Primary Examiner* — Danny Nguyen
(74) *Attorney, Agent, or Firm* — Lerner, David, Littenberg, Krumholz & Mentlik, LLP

(57) ABSTRACT

A structural composite component, in particular for an aircraft or spacecraft, includes: a lightning strike protection layer; and a composite battery including a cathode layer and a separation layer, wherein the lightning strike protection layer is formed integrated with the cathode layer, and wherein the separation layer is configured for providing acoustic damping, and/or fire barrier, and/or impact resistance to the structural composite component. A method for configuring such a structural composite component; and an aircraft or spacecraft including such a structural composite component are also described.

16 Claims, 5 Drawing Sheets

(51) Int. Cl.

| | | |
|---|---|---|
| *B32B 15/02* | (2006.01) | |
| *H01M 2/02* | (2006.01) | |
| *B32B 7/06* | (2019.01) | |
| *B32B 15/08* | (2006.01) | |
| *B32B 15/14* | (2006.01) | |
| *B32B 15/00* | (2006.01) | |
| *B32B 27/00* | (2006.01) | |
| *B32B 9/04* | (2006.01) | |
| *B32B 7/02* | (2019.01) | |
| *B32B 5/00* | (2006.01) | |
| *B32B 9/00* | (2006.01) | |
| *B32B 3/26* | (2006.01) | |
| *B32B 27/06* | (2006.01) | |
| *B32B 7/04* | (2019.01) | |
| *B32B 27/28* | (2006.01) | |
| *B32B 7/10* | (2006.01) | |
| *B32B 15/04* | (2006.01) | |
| *B32B 5/02* | (2006.01) | |
| *B32B 7/00* | (2019.01) | |
| *B32B 15/20* | (2006.01) | |

(52) U.S. Cl.
CPC .............. *B32B 15/14* (2013.01); *B32B 15/20* (2013.01); *B32B 27/00* (2013.01); *B32B 27/06* (2013.01); *B32B 27/28* (2013.01); *H01M 2/0267* (2013.01); *H01M 2/0295* (2013.01); *B32B 2250/00* (2013.01); *B32B 2262/00* (2013.01); *B32B 2262/106* (2013.01); *B32B 2307/10* (2013.01); *B32B 2307/102* (2013.01); *B32B 2307/20* (2013.01); *B32B 2307/202* (2013.01); *B32B 2307/30* (2013.01); *B32B 2307/3065* (2013.01); *B32B 2307/50* (2013.01); *B32B 2307/558* (2013.01); *B32B 2307/56* (2013.01); *B32B 2307/732* (2013.01); *B32B 2457/00* (2013.01); *B32B 2457/10* (2013.01); *B32B 2571/00* (2013.01); *B32B 2605/00* (2013.01); *B32B 2605/18* (2013.01)

(56) References Cited

FOREIGN PATENT DOCUMENTS

| | | |
|---|---|---|
| DE | 10 2006 046002 A1 | 4/2008 |
| GB | 379 299 | 8/1932 |
| WO | 2014/207236 A1 | 12/2014 |

* cited by examiner

STRUCTURAL COMPOSITE COMPONENT AND METHOD FOR CONFIGURING A STRUCTURAL COMPOSITE COMPONENT

FIELD OF THE INVENTION

The present invention refers to a structural composite component, in particular for an aircraft or spacecraft, to a method for configuring a structural composite component of this type, and to an aircraft or spacecraft comprising such a structural composite component.

One aspect of the present invention may provide a structural composite component that is capable of storing energy, at the time that offers an additional functionality.

Another aspect of the invention may provide a structural composite component compatible with the manufacturing conditions of composite structures, to be easily incorporated to the traditional manufacturing process.

Although applicable to any kind of structure, for example various kinds of vehicles, in particular aircraft, spacecraft or the like, the present invention and the problem on which it is based will be explained in greater detail with reference to the skin of commercial aircraft.

BACKGROUND OF THE INVENTION

Modern skins of aircraft are often constructed with composite material. For protection against lightning strike and/or magnetic pulse, usually an additional highly conductive layer, the so called lightning strike protection (LSP), is incorporated into the skin.

FIG. 1A shows a sectional view of a typical composite laminate 101 for an aircraft skin known by the applicant. The laminate 101 comprises an outside paint 105. Directly under the paint 105, an LSP 102 is provided. The LSP 102 is followed by several layers of carbon fiber reinforced polymer 111.

FIG. 1B shows an exploded view of typical layers of an LSP 102 comprising, among others, a copper mesh 112 embedded in a resin film 113.

The document DE 10 2006 046 002 A1 describes another multilayer system for lightning strike protection comprising a paint layer including polarized particles.

Furthermore, in recent years, attempts have been made to develop battery function integrated in a composite structure. FIG. 2 shows a basic build-up of a composite battery cell 103 known by the applicant. The general buildup comprises a cathode layer 104 sandwiched between two separator layers. Two anode layers 106 are arranged at the bottom and the top of the stack.

BRIEF SUMMARY OF THE INVENTION

An aspect of the present invention may provide for an improved structural composite component. Furthermore, another aspect of the present invention may provide for a method for configuring such an improved structural composite component.

According to one aspect, therefore, the present invention provides a structural composite component, in particular for an aircraft or spacecraft, comprising: a lightning strike protection layer; and a composite battery comprising a cathode layer and a separation layer, wherein the lightning strike protection layer is formed integrated with the cathode layer, and wherein the separation layer is configured for providing acoustic damping, and/or a fire barrier, and/or an impact resistance.

According to another aspect, the present invention provides a method for configuring a structural composite component, in particular for an aircraft or spacecraft, the method comprising: providing an anode layer, a separation layer, and a lightning strike protection layer, wherein the separation layer is configured for providing acoustic damping, and/or fire barrier, and/or impact resistance; stacking the anode layer, the separation layer and the lightning strike protection layer; and contacting the anode layer and the lightning strike protection layer to form a composite battery, wherein the lightning strike protection layer is contacted as cathode layer.

According to another aspect, the present invention provides an aircraft or spacecraft comprising a structural composite component, in particular an outer skin, according to the invention and/or formed by a method according to the invention.

One idea of the present invention is to provide a structural composite component configured as a battery including a separation layer configured for providing acoustic damping, and/or a fire barrier, and/or an impact resistance. The structural composite component further comprises a lightning strike protection layer integrally formed with the cathode layer of the composite battery. This last is achieved in particular in that the lightning strike protection layer is used as the cathode layer of the composite battery.

This means, in contrast to a conventional composite battery, the stack of layers is changed in that the cathode forms an uppermost or outermost layer.

In addition, in contrast to a conventional composite battery in which the separation layer used to be a glass ply, the separation layer of the structural composite component of the invention is configured to offer a new functionality within the component, in particular, this layer may act as acoustic damping, and/or as a fire barrier, and/or as protection against impact.

Furthermore, the lightning strike protection layer of the structural composite component according to an embodiment of the invention, in contrast to a conventional LSP, is contacted as the cathode of the composite battery. In particular, the lightning strike protection layer is formed and stacked correspondingly.

In this way, a conventional cathode layer is omitted. Therefore, weight of the composite component can be reduced, in particular in comparison to a component including separate composite battery and lightning strike protection, especially having both, a separate lightning strike protection layer and cathode layer.

In addition to the weight, also the laminate thickness can be reduced. Furthermore, since the conventional cathode layer is omitted, less material is necessary. Therefore, cost for material and for manufacturing labor can be reduced.

The method for configuring and/or manufacturing the structural composite component comprises providing an anode layer, a separation layer, and a lightning strike protection layer, the separation layer being configured for providing acoustic damping, and/or fire barrier, and/or impact resistance, stacking the anode, the separation layer and the lightning strike protection layer, and further contacting the anode and the lightning strike protection layer to form a composite battery. In particular, the separation layer is arranged between the anode layer and the lightning strike protection layer. Furthermore, contacts are provided, wherein a positive contact is provided for the lightning strike protection layer and a negative contact is provided for the anode layer. In particular, the lightning strike protection layer thereby is contacted and configured, for example formed and stacked accordingly, to function as cathode layer. Thereby, the function of LSP is kept, in particular fully kept.

The aircraft or spacecraft according to an embodiment of the present invention preferably comprises such a structural composite component formed as an outer skin. In this way, at the same time a large surface serving as composite battery and effective lightning strike protection are provided integrated into the outer skin at minimum weight. Further, this outer skin provides additional functionalities, such as acoustic damping, and/or a fire barrier, and/or an impact resistance.

The lightning strike protection layer preferably comprises metal, in particular highly conductive metal, such as for example copper.

The separator preferably comprises a fire barrier layer, such as for example an aramid or a thermoplastic, an impact protection layer, such as for example an aramid, or a vibro-acoustic damping layer, such as an elastomer.

According to an embodiment, the structural composite component is configured as a painted multi-layer skin portion. In particular, the painted multi-layer skin portion is configured for forming an outer skin of an aircraft or spacecraft, e. g. a fuselage skin portion. In this way, both the composite battery and lightning strike protection function are integrated into a skin, for example the skin of an aircraft or spacecraft, at the same time that this skin offers extra functionalities.

According to an embodiment, the lightning strike protection layer formed integrated with the cathode layer is arranged at an outermost layer of the multi-layer skin portion. In particular, the lightning strike protection layer configured as the cathode layer is arranged directly under the paint. This means, the stack of the composite battery is adapted in that the cathode layer is arranged as the outermost layer. In this way, integration of the cathode layer and the lightning strike protection layer is feasible without any reduction of lightning strike protection function.

According to an embodiment, the lightning strike protection layer is configured as the cathode layer. In particular, the lightning strike protection layer configured as the cathode layer is formed as a single layer. This means, the cathode and the lightning strike protection layer are not just merged with each other, but the lightning strike protection layer is used in an extra function as a cathode, preferably formed as one single common layer. Accordingly, this layer is designed, for example in terms of thickness, surface, electric potential and/or conductivity, to fulfill both functions of a cathode for the composite battery and of providing lightning strike protection for the structural composite component.

According to an advantageous embodiment, the lightning strike protection layer configured as the cathode layer is formed as a metallic mesh, in particular as a copper mesh. In this way, high conductivity of the lightning strike protection layer is provided. As an alternative to copper, other highly conductive metal, such as e. g. aluminium, may be used. The metallic mesh may be formed, for example, as an expanded foil.

According to a preferred embodiment, the composite battery further comprises an anode layer. The separation layer is arranged between the anode layer and the lightning strike protection layer, which is configured as the cathode layer. The anode layer and the separation layer are integrated into the structural composite component. In particular, the anode layer and the separation layer are integrated in a stack of layers of the structural composite component. In this way, the composite battery is advantageously formed fully integrated with the structural composite component.

According to an embodiment, the capacity of the composite battery is adapted to the thickness of the lightning strike protection layer. Alternatively or in addition, the capacity of the composite battery may be adapted to the surface of the lightning strike protection layer. This means, the lightning strike protection layer forms a design constraint, the rest of the composite battery, in particular the thickness and/or surface of the anode, is adapted to. In this way, the lightning strike protective function is ensured. For example, according to an embodiment, the anode comprises a plurality of fiber layers, in particular carbon fiber layers or plies, wherein the number of contacted fiber layers is adapted to the thickness and/or surface of the lightning strike protection layer in terms of capacity of the composite battery.

According to another embodiment, the thickness of the lightning strike protection layer is enhanced to be adapted to the capacity of the composite battery. Alternatively or in addition, the surface of the lightning strike protection layer may be enhanced for adaption. This means, the minimum thickness and or surface of the lightning strike protection layer necessary for providing the lightning strike protective function forms a minimum constraint in design. However, the thickness and/or surface of the lightning strike protection layer may be enhanced in order to fit to the other components, in particular the anode, of the composite battery. In particular, the thickness and/or surface is enhanced if the desired capacity of the composite battery is higher than the capacity corresponding to the minimum thickness and/or surface of the lightning strike protection layer. For example, the anode comprises a plurality of fiber layers, in particular carbon fiber layers or plies. In this case, thickness and/or surface of the lightning strike protection layer is enhanced, in particular to more than a usual thickness of 0.02 mm to 0.15 mm, to be adapted to the contacted number of fiber layers in terms of capacity of the composite battery.

According to an embodiment, the thickness of the lightning strike protection layer may be enhanced by providing a single lightning strike protection layer of enhanced thickness. In this way, handling and manufacturing is advantageously easy.

According to another embodiment, the thickness of the lightning strike protection layer may be enhanced by providing a multilayer lightning strike protection layer, for example a lightning strike protection double layer. In this way, changing the thickness is feasible in a flexible way.

According to an embodiment of the method for configuring the structural composite component, the stack is formed as a painted multi-layer skin portion and the lightning strike protection layer configured and contacted as cathode is positioned as an outermost layer thereof. In particular, the lightning strike protection layer configured and contacted as cathode is arranged directly under the paint. Accordingly, the stack of the composite battery is adapted in that the cathode layer is arranged as an outermost layer. In this way, integration of the cathode layer and the lightning strike protection layer is feasible without any reduction of lightning strike protection function compared to conventional LSP.

According to another embodiment of the method, stacking the lightning strike protection layer comprises stacking a single metallic mesh. Furthermore, contacting the lightning strike protection layer comprises contacting the single metallic mesh. This single metallic mesh is designed to fulfill both functions of a cathode for the composite battery and of lightning protection for the structural composite component. In particular, the mesh may be formed as a copper mesh. In this way, high conductivity of the lightning strike protection layer is provided. As an alternative to copper, another highly conductive metal, such as e. g. aluminum, may be used. The metallic mesh may be formed, for example, as an expanded grid or expanded foil.

According to another embodiment of the method, stacking the anode layer comprises stacking a plurality of contacted fiber layers, in particular carbon fiber layers or plies. In this case, the number of contacted fiber layers is adapted to the thickness and/or surface of the lightning strike protection layer. Alternatively, the thickness and/or surface of the lightning strike protection layer can be enhanced to be adapted to the number of contacted fiber layers, in particular in case the number of contacted fiber layers is high. In this way, the composite battery this optimized and full lightning strike protection is kept.

BRIEF DESCRIPTION OF THE DRAWINGS

For a better comprehension of the invention, the following drawings are provided for illustrative and non-limiting purposes, wherein.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1A:
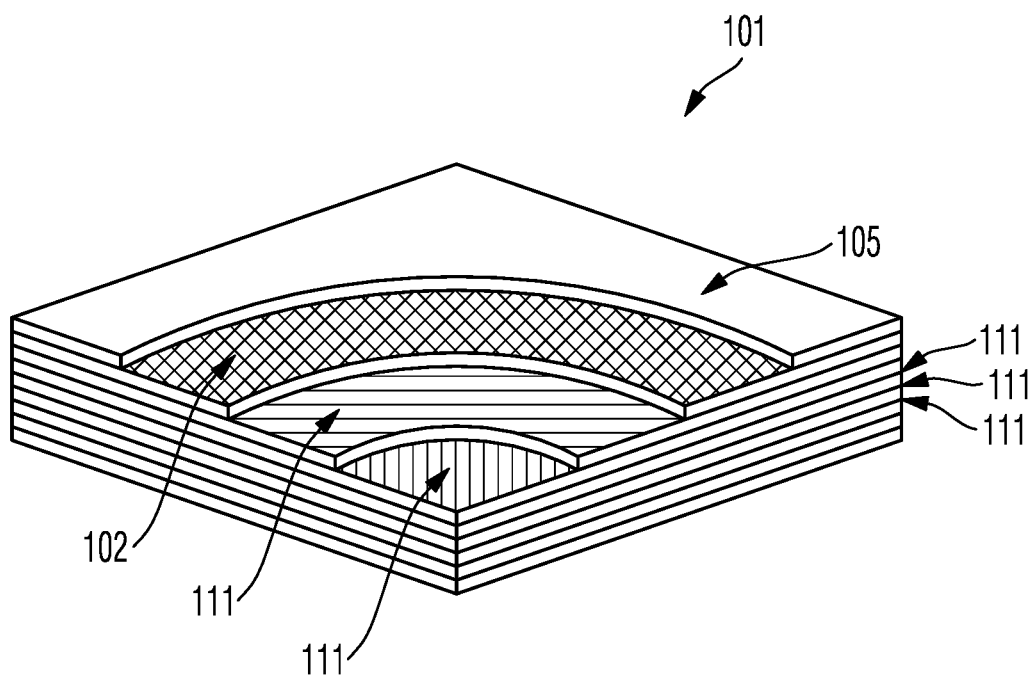
FIG. 1A shows a sectional view of a typical composite laminate for an aircraft skin.

FIG. 1A schematically illustrates a sectional view of a typical composite laminate for outer skin.

In FIG. 1, reference sign 101 denotes a laminate comprising an outside paint 105 functioning as surface protection and cosmetic layer. Under the paint 105, a layer for lightning strike protection (LSP) 102 is provided comprising a metal mesh. The LSP 102 is followed by several plies of carbon fiber reinforced polymer (CFRP) 111 with different orientation providing structural strength. For example, a first CFRP ply 111 is oriented +45° and a second CFRP ply 111 is oriented +45°. Further CFRP plies 111 may be oriented 90° and 0°.

Figure 1B:
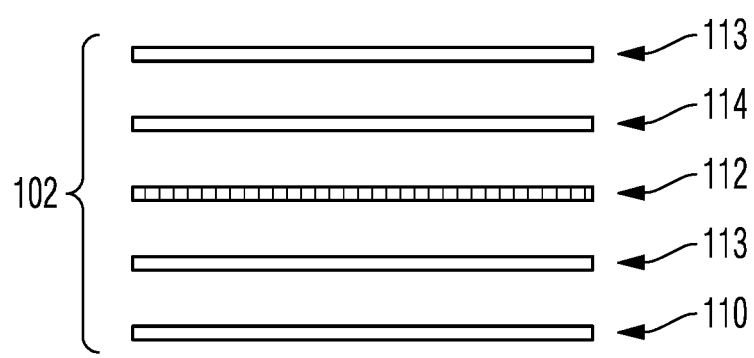
FIG. 1B shows an exploded view of typical layers of a lightning strike protection.

FIG. 1B shows an exploded view of typical layers of an LSP 102.

The LSP 102 itself comprises several layers. An uppermost layer may be configured as resin film 113 functioning as a tool surface, on which the paint 105 may be applied. The resin film 113 comprises a mat/veil carrier 114, which is placed on a metal mesh 112, e. g. configured as expanded copper foil (ECF). The metal mesh 112 has a typical thickness between 0.02 mm and 0.15 mm and provides for electric conductivity.

Underneath the metal mesh 112, another resin film 113 is placed. The bottom layer of the LSP is formed by a paper 110 which serves for placement of the LSP in the panel lamination.

Figure 2:
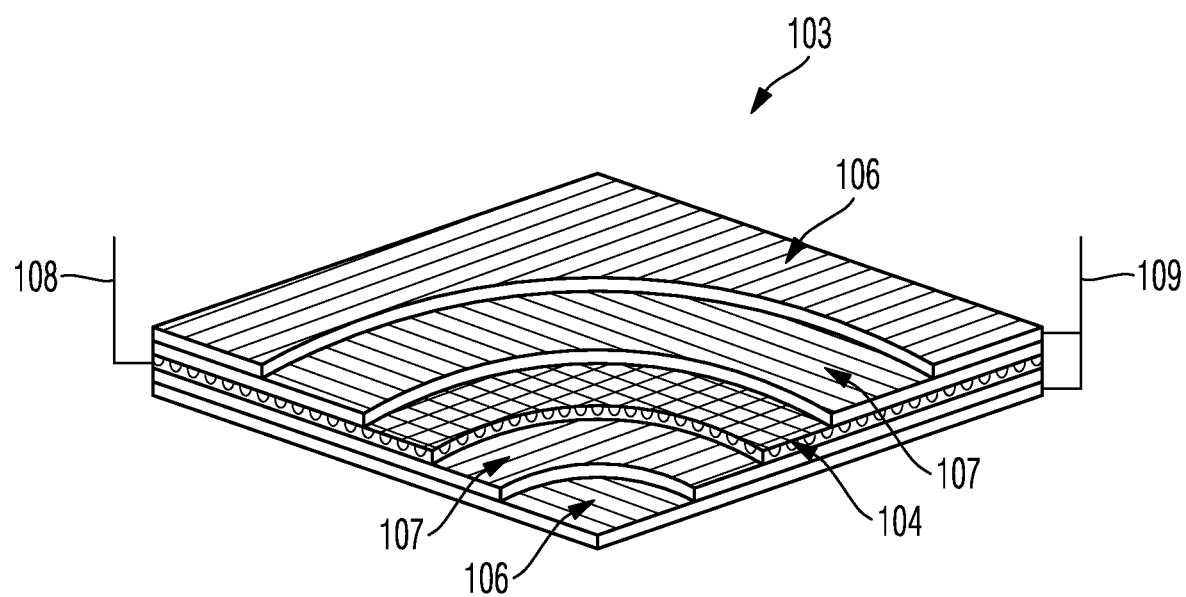
FIG. 2 shows a sectional view of a basic build-up of a composite battery cell.

FIG. 2 schematically illustrates a sectional view of a basic build-up of a composite battery cell 103.

The composite battery cell 103 is formed as a stack of layers comprising a cathode layer 104, which is for example configured as a ferritic oxide mesh or as a copper mesh. The cathode layer 104 is arranged in the middle of the stack sandwiched between two separator layers 107 and contacted with a positive contact 108. The separator layers 107 are configured for separating negative and positive parts of the composite battery 103. However, they are configured ion-transmissive, meaning they let charged ion particles transfer through. For example, the separator layers may comprise a glass fiber mesh or glass fiber reinforced plastic, an aramid, a thermoplastic, an elastomer . . . .

On the top and on the bottom of the stack, respectively, an anode layer 106 is arranged and contacted with a negative contact 109. The anode layers 106 comprise for example unidirectional tape or fabric of carbon fiber plies embedded in a solid polymer resin. The polymer resin serves as electrolyte letting ions move, while the carbon fibers function as anode.

Figure 3:
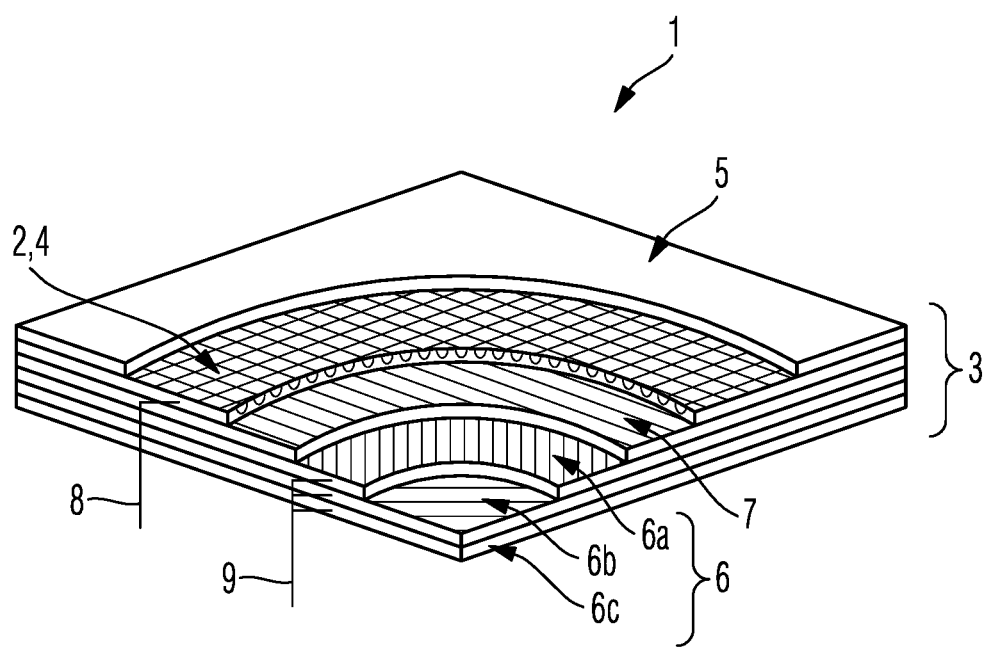
FIG. 3 shows a sectional view of a structural composite component, according to a first embodiment of the present invention.

FIG. 3 schematically illustrates a sectional view of a structural composite component 1 according to a first embodiment of the present invention.

The structural composite component 1 comprises a metallic lightning strike protection layer 2 and a composite battery 3.

The composite battery 3 comprises an anode layer 6, a separation layer 7 and a cathode layer 4, which are integrated in the stack of the structural composite component 1.

The lightning strike protection layer 2 is configured as the cathode layer 4. Accordingly, the lightning strike protection layer 2 configured as the cathode layer 4 is contacted by a positive contact 8 of the composite battery 3.

Furthermore, the anode layer 6 is contacted with a negative contact 9 of the composite battery 3.

The separation layer 7 is configured for providing acoustic damping, and/or a fire barrier, and/or an impact resistance, and is arranged between the anode layer 6 and the lightning strike protection layer 2 configured as the cathode layer 4.

The lightning strike protection layer 2 configured as the cathode 4 is covered by paint 5 functioning as a surface protection and cosmetic layer. For example, the paint may be configured with logos or the like.

The anode layer 6 is formed by a plurality of fiber layers 6a, 6b, 6c. In the embodiment depicted in FIG. 3, for example three contacted fiber layers 6a, 6b, 6c are provided to form the anode layer 6. However, it will be understood that any suitable number of contacted fiber layers 6a, 6b, . . . 6n may be provided to form the anode layer 6. In particular, the capacity of the composite battery 3 can be adapted to the thickness or surface of the lightning strike protection layer 2 by variation of the number of the contacted fiber layers 6a, 6b, . . . 6n.

Furthermore, additional fiber layers (not shown) which are not contacted may be provided in the stack for structural purposes.

The structural composite component 1 forms a skin portion, in particular for an aircraft or spacecraft 10, configured for providing additional functionalities, such as acoustic damping, and/or a fire barrier, and/or an impact resistance. Thereby, the lightning strike protection layer 2 configured as the cathode layer 4 forms the outermost layer of the skin portion directly under the paint 5.

In the embodiment shown, the lightning strike protection layer 2 configured as the cathode layer 4 is formed as a single layer made of a metallic mesh. Preferably, metallic mesh is configured as a copper mesh. For example, a copper mesh product named "Microgrid® material" by Dexmet Corporation, Wallingford, Conn., USA, may be used. The thickness of the copper mesh is chosen at least according to requirements for LSP and may be chosen bigger, if desired for the cathode function.

Figure 4:
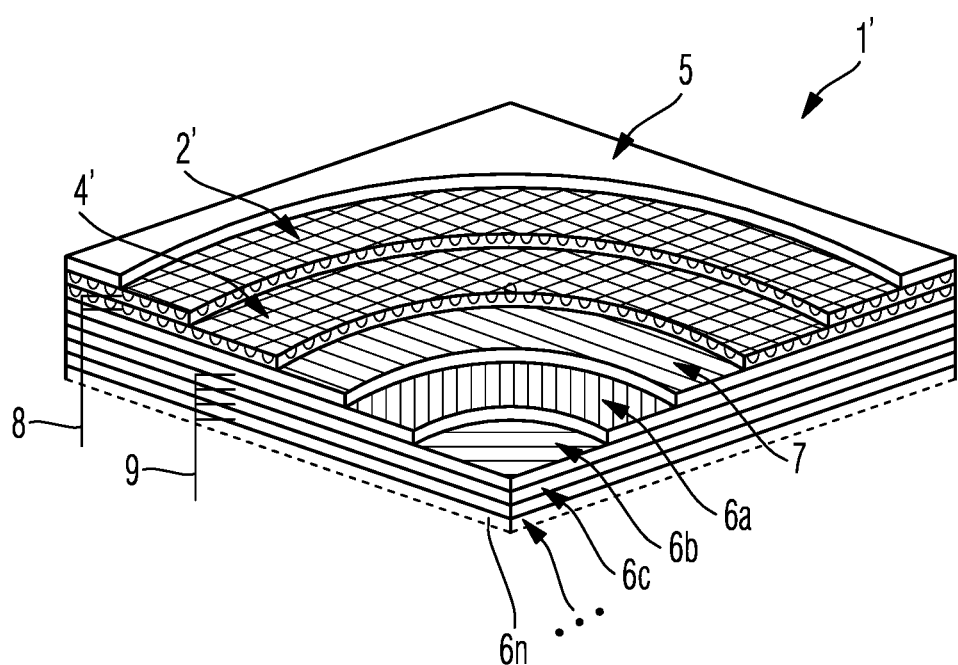
FIG. 4 shows a sectional view of a structural composite component, according to a second embodiment of the present invention.

FIG. 4 schematically illustrates a sectional view of a structural composite component 1' according to a second embodiment.

The composite component 1' differs from the composite component 1 of FIG. 3 in that the anode layer 6 comprises a plurality of contacted fiber layer 6a, 6b, 6c, 6d, . . . , 6n. In this way, composite battery 3 is configured with a higher capacity.

Accordingly, the thickness of the lightning strike protection layer 2' configured as cathode 4' is enhanced. In the embodiment shown, as an example only, a lightning strike protection layer 2' of enhanced thickness is formed as a double layer of two metal meshes. Therefore, two directly contacted metal meshes are stacked directly upon each other to form the lightning strike protection layer 2' configured as cathode layer 4' with enhanced thickness.

It will be understood that according to another embodiment, a single metal mesh with enhanced thickness may be used instead of a double layer to form the lightning strike protection layer 2'.

As explained with regard to FIG. 3, the metal meshes are preferably configured as copper meshes.

Figure 5:
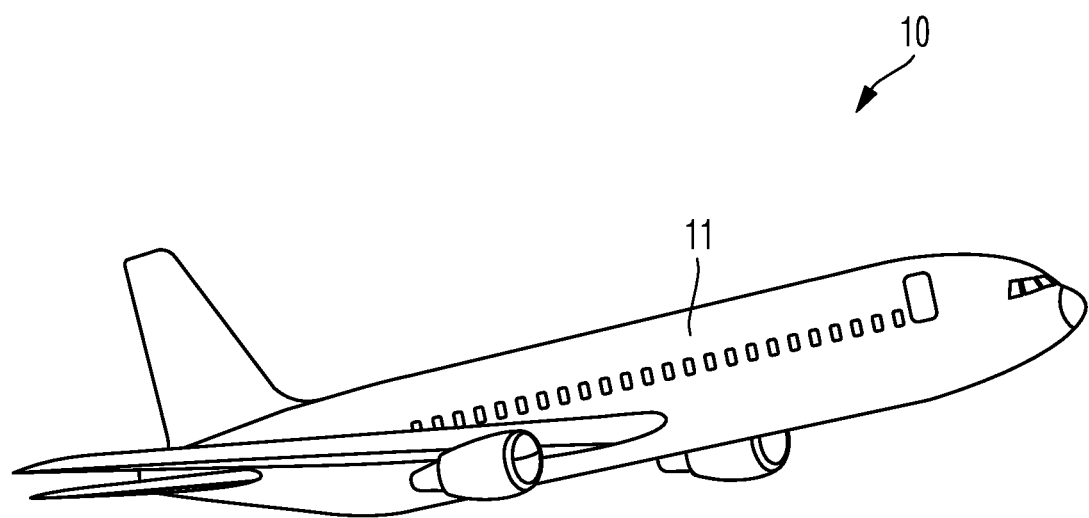
FIG. 5 shows an aircraft or spacecraft according to an embodiment of the present invention.

FIG. 5 schematically illustrates an aircraft or spacecraft 10.

The aircraft or spacecraft 10 is configured as a commercial aircraft and comprises a fuselage with an outer skin 11. The outer skin 11 is formed as a structural composite component 1, 1' comprising a metallic lightning strike protection layer 2 and a composite battery 3 comprising a cathode layer 4, 4' and a separation layer 7, wherein the metallic lightning strike protection layer 2 is configured as cathode 4 of the composite battery 3, and wherein the separation layer 7 is configured for providing acoustic damping, and/or a fire barrier, and/or an impact resistance, as described with reference to FIG. 3 or FIG. 4.

Although specific embodiments of the invention are illustrated and described herein, it will be appreciated by those of ordinary skill in the art that a variety of alternate and/or equivalent implementations exist.

It will be appreciated that the exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural composite component for an aircraft or spacecraft, comprising:
   a lightning strike protection layer; and
   a composite battery comprising a cathode layer and a separation layer,
   wherein the lightning strike protection layer is formed integrated with the cathode layer, and
   wherein the separation layer is configured for providing at least one of acoustic damping, a fire barrier, and an impact resistance,
   wherein the structural composite component is configured as a painted multi-layer skin portion, and
   wherein the lightning strike protection layer formed integrated with the cathode layer is arranged as an outermost layer of the multi-layer skin portion.

2. The structural composite according to claim 1, wherein the lightning strike protection layer formed integrated with the cathode layer is arranged directly under the paint.

3. The structural composite component according to claim 1, wherein the lightning strike protection layer is configured as the cathode layer, such that the cathode layer forms a single layer.

4. The structural composite component according to claim 3, wherein the lightning strike protection layer configured as the cathode layer is formed as a metallic mesh.

5. The structural composite component according to claim 3, wherein the lightning strike protection layer configured as the cathode layer is formed as a copper mesh.

6. A structural composite component for an aircraft or spacecraft, comprising:
   a lightning strike protection layer; and
   a composite battery comprising a cathode layer and a separation layer,
   wherein the lightning strike protection layer is formed integrated with the cathode layer, and
   wherein the separation layer is configured for providing at least one of acoustic damping, a fire barrier, and an impact resistance,
   wherein the lightning strike protection layer is configured as the cathode layer, such that the cathode layer forms a single layer,
   wherein the composite battery further comprises an anode layer,
   wherein the separation layer is arranged between the anode layer and the lightning strike protection layer configured as the cathode layer, and
   wherein the anode layer and the separation layer are integrated into the structural composite component.

7. The structural composite component according to claim 6, wherein the capacity of the composite battery is adapted to a thickness and/or surface of the lightning strike protection layer.

8. The structural composite component according to claim 7, wherein the anode layer comprises a plurality of fiber layers,
wherein the number of contacted fiber layers is adapted to the thickness and/or surface of the lightning strike protection layer in terms of capacity of the composite battery.

9. The structural composite component according to claim 8, wherein the anode layer comprises a plurality of carbon fiber layers.

10. The structural composite component according to claim 6, wherein the thickness and/or surface of the lightning strike protection layer is enhanced to be adapted to the capacity of the composite battery.

11. The structural composite component according to claim 10, wherein the anode layer comprises a plurality of fiber layers,
wherein the thickness and/or surface of the lightning strike protection layer is enhanced, to more than 0.15 mm, to be adapted to the number of contacted fiber layers in terms of capacity of the composite battery.

12. A method for configuring a structural composite component for an aircraft or spacecraft, the method comprising:
providing an anode layer, a separation layer, and a lightning strike protection layer, the separation layer being configured for providing at least one of acoustic damping, fire barrier, and impact resistance;
stacking the anode layer, the separation layer, and the lightning strike protection layer; and
contacting the anode layer and the lightning strike protection layer to form a composite battery,
wherein the lightning strike protection layer is contacted as cathode layer.

13. The method according to claim 12, wherein the stack is formed as a painted multi-layer skin portion, and the lightning strike protection layer contacted as cathode layer is positioned as an outermost layer thereof.

14. The method according to claim 12, wherein stacking the lightning strike protection layer comprises stacking a single metallic mesh, and
wherein contacting the lightning strike protection layer comprises contacting the single metallic mesh.

15. The method according to claim 12, wherein stacking the anode layer comprises stacking a plurality of contacted fiber layers,
wherein the number of contacted fiber layers is adapted to the thickness and/or surface of the lightning strike protection layer or
wherein the thickness and/or surface of the lightning strike protection layer contacted as cathode layer is enhanced to be adapted to the number of contacted fiber layers.

16. An aircraft or spacecraft comprising a structural composite component, according to claim 1.

* * * * *